United States Patent [19]
Kim

[11] Patent Number: 6,142,495
[45] Date of Patent: Nov. 7, 2000

[54] STABILIZER FOR VEHICLE

[75] Inventor: Keun-bae Kim, Seoul, Rep. of Korea

[73] Assignee: Hyundai Motor Company, Seoul, Rep. of Korea

[21] Appl. No.: 09/185,146

[22] Filed: Nov. 3, 1998

[30] Foreign Application Priority Data

Nov. 4, 1997 [KR] Rep. of Korea ........................ 97-57954

[51] Int. Cl.$^7$ ....................................................... B60P 3/00
[52] U.S. Cl. ............................... 280/124.111; 280/124.12; 280/124.13; 280/124.179; 74/109
[58] Field of Search ........................ 280/124.12, 124.13, 280/124.179, 124.111; 74/109, 422

[56] References Cited

U.S. PATENT DOCUMENTS

| | | | |
|---|---|---|---|
| 2,032,657 | 3/1936 | Frederickson | 280/124.111 |
| 2,706,009 | 4/1955 | Schramm | 180/53.4 |
| 3,689,103 | 9/1972 | Meulendyk | 280/124.13 |
| 4,943,082 | 7/1990 | Kijima et al. | 280/124.13 |

*Primary Examiner*—Kevin Hurley
*Assistant Examiner*—Hau Phan
*Attorney, Agent, or Firm*—Christie, Parker & Hale, LLP

[57] ABSTRACT

A stabilizer for a vehicle including an automotive suspension having a lower control arm connecting a wheel to a sub-frame. The stabilizer includes a rotating member for rotating together with a pivotal motion of the lower control arm, a reciprocating member for converting the rotating motion of the rotating member into a reciprocating motion, and an elastic member for suppressing the reciprocation motion of the reciprocating member, thereby minimizing the pivotal motion of the lower control arm.

13 Claims, 2 Drawing Sheets

STABILIZER FOR VEHICLE

CROSS-REFERENCE TO RELATED APPLICATIONS

This application claims priority of Korean Patent Application No. 97-57954 filed on Nov. 4, 1997, the disclosure of which is incorporated herein by reference.

BACKGROUND OF THE INVENTION (a) Field of the Invention

The present invention relates to a stabilizer for a vehicle, and more particularly, to a stabilizer which is light in weight and can be mounted in a relatively small space.

(b) Description of the Related Art

A stabilizer is used in a vehicle to reduce sway and stabilize front and rear suspensions.

Well known is a stabilizer having a wide U-shaped torsion bar with opposite ends thereof respectively attached to each of lower control arms through rubber mounts or links. The center section of the U-shaped torsion bar is mounted to a frame at two points by the rubber mounts and can pivot at these points. The torsion bar is made of spring steel, which gives it the elasticity to bend or deflect and then return to its relaxed position.

When the vehicle is stationary with both wheels at the same level, there is no tension on the bar. When one wheel or the other is raised or lowered, the opposite end of the bar held by the other wheel causes the bar to twist, thereby helping to maintain the vehicle in a more level position than it would otherwise be. Thus, the vehicle sway or lean in a turn is reduced.

However, since the torsion bar used for the stabilizer is long, making it very difficult to provide a mounting space when designing the vehicle. In addition, the torsion bar increases the weight of the stabilizer, resulting in increasing the total weight of the vehicle.

Furthermore, since the torsion bar moves along a predetermined trace, a corresponding space is required to enable this movement, thereby further posing a difficulty in providing a mounting space for the stabilizer.

SUMMARY OF THE INVENTION

Therefore, the present invention has been made in an effort to solve the above-described problems.

It is an objective of the present invention to provide a stabilizer that is low in weight and can be mounted in a small space, thereby reducing a total weight of a vehicle and making it easy to design the vehicle.

It is another objective of the present invention to provide a stabilizer that can prevent the tail-up and nose-down phenomenon occurring respectively when a vehicle abruptly starts and stops.

To achieve the above objectives, the present invention provides a stabilizer for a vehicle including an automotive suspension having a lower control arm connecting a wheel to a sub-frame. The stabilizer includes a rotating member for rotating together with a pivotal motion of the lower control arm, a reciprocating member for converting the rotating motion of the rotating member into a reciprocating motion, and an elastic member for suppressing the reciprocation motion of the reciprocating member, thereby minimizing the pivotal motion of the lower control arm.

The rotating member comprises a pinion gear fixed around a hinge rod pivotally coupling the lower control arm to the sub-frame.

The reciprocating member comprises a rack gear engaged with the pinion gear, the rack gear being slidably disposed within a guide groove formed on the sub-frame.

The elastic member comprises a compression spring fixedly disposed between an end of the guide groove and one end of the rack gear distal from the hinge rod.

BRIEF DESCRIPTION OF THE DRAWINGS

The accompanying drawings, which are incorporated in and constitute a part of the specification, illustrate an embodiment of the present invention, and, together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 1:
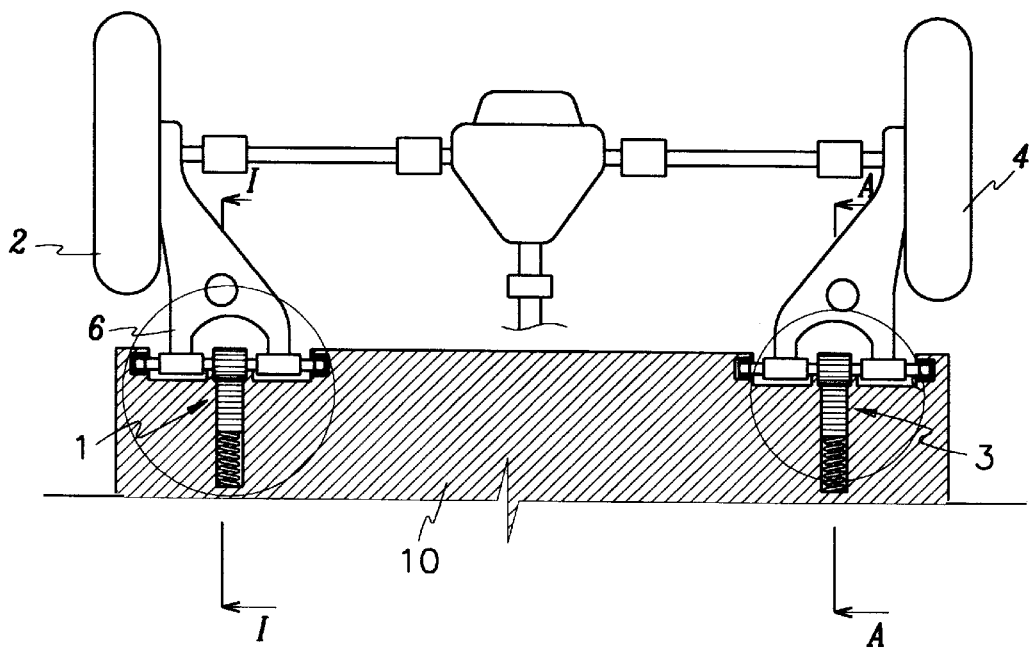
FIG. 1 is a plane, partly in section, view illustrating a rear wheel suspension where a stabilizer assembly according to a preferred embodiment of the present invention is employed.

FIG. 1 shows a rear wheel suspension system where a stabilizer assembly according to a preferred embodiment of the present invention is employed.

The inventive stabilizer assembly includes left and right stabilizers 1 and 3 respectively provided to left and right rear wheel sides. Since the left and right stabilizers 1 and 3 are identical in structure, only the left stabilizer 1 will be described hereinafter.

As shown in FIG. 1, the left stabilizer 1 is mounted between a lower control arm 6 and a sub-frame 10. The lower control arm 6 has a first end coupled to a wheel carrier (not shown) rotatably supporting the wheel 2 and a second end pivotally coupled to the sub-frame 10.

Figure 2:
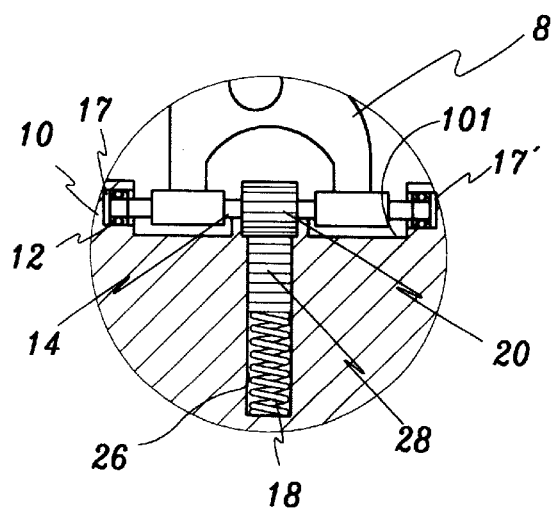
FIG. 2 is an enlarged view of a circled portion, which illustrates a stabilizer according to a preferred embodiment of the present invention, of FIG. 1 of FIG. 1.

The structure of the stabilizer 1 will be described more in detail with reference to FIG. 2.

The sub-frame 10 is provided with a groove 101 for receiving the second end of the lower control arm 6 and opposing holes 17 and 17' respectively formed through opposing side walls defining the groove 101. There is provided a hinge rod 14, opposite ends of which are rotatably supported within the opposing holes 17 and 17 by bearings 12. The second end of the lower control arm 6 is coupled to the hinge rod 14.

The inventive stabilizer 1 comprises a rotating member 20 mounted on the hinge rod 14 to rotate together with a pivotal motion of the lower control arm 6, a reciprocating member 28 mounted in the sub-frame 10 to convert the rotating motion of the rotating member 20 into reciprocating motion, and an elastic member 18 such as a compression spring for elastically supporting the reciprocating member 28.

Preferably, the rotating member 20 is a pinion gear fixed around the hinge rod 14, and the reciprocating member 28 is a rack gear engaged with the pinion gear. The rack gear 28 is slidably disposed within a guide groove 26 formed in the sub-frame 10. The elastic member 18 is disposed between an end the guide groove 26 and one end of the rack gear 28 distal from the hinge rod 14.

Figure 3:
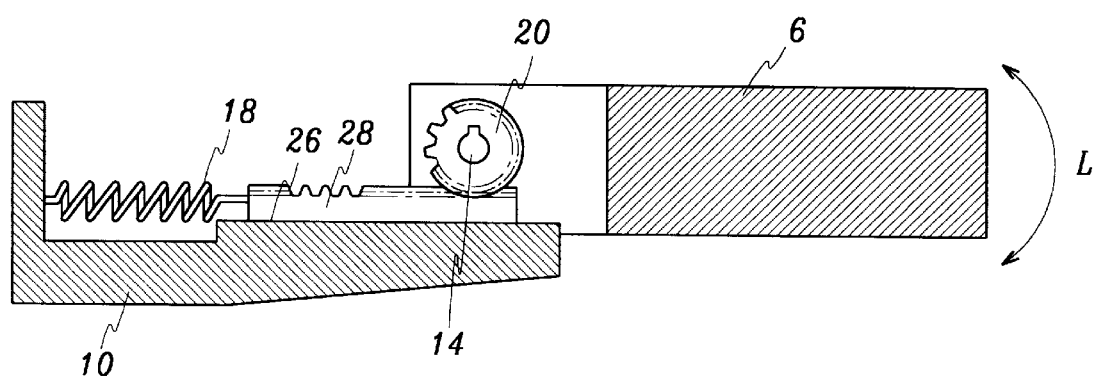
FIG. 3 is a sectional view taken along a line I—I.

The operation of the stabilizer as described above will be described hereinafter with reference to FIG. 3 showing a sectional view taken along a line I—I of FIG. 1.

The lower arm 6 coupled to the left wheel carrier pivots in a direction L of the arrow together with the hinge rod 14 when the vehicle is turning, abruptly stopping, or abruptly starting, and the pinion gear 20 rotates in the same direction as the pivot direction of the lower arm 6. Consequently, the rack gear 28 engaged with the pinion gear 20 reciprocates in the guide groove 26 of the sub-frame 10. At this point, the elastic member 18 disposed between the rack gear 28 and the end of the guide groove 26 suppresses the reciprocating motion of the rack gear 28, thereby ultimately suppressing the pivoting motion of the lower arm 6.

For example, when the vehicle makes a left turn, the left wheel is forced downward while the right wheel is forced upward, thereby making the vehicle sway. At this point, the left lower arm 6 pivots downward, thereby rotating the hinge rod 14 and the pinion gear 20 clockwise in the drawing. Accordingly, the rack gear 28 moves toward the end of the guide groove 26. However, the movement of the rack gear 28 is elastically suppressed by the elastic member 18, preventing the left wheel from excessively moving downward. At the same time, the right lower arm pivots upward around the hinge rod, rotating the pinion gear counterclockwise to move the rack gear away from the end of the guide groove. However, the movement of the rack gear 28 is elastically suppressed by the elastic member 18, preventing the right wheel from excessively moving upward.

When the vehicle abruptly starts and stops, the nose-down and tail-up phenomenon can be prevented in the same manner.

In the above-described embodiment, although the inventive stabilizer is provided to only rear wheel sides, it is also possible that the stabilizer is provided to front wheel sides.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A stabilizer for a vehicle, said vehicle comprising an automotive suspension having a sub-frame, hinge arm coupled to the sub-frame, and lower control arm coupled to a wheel and pivotally coupled to the hinge rod, said stabilizer comprising:

a pinion gear rotating together with a pivotal motion of the lower control arm;

reciprocating means coupled to said pinion gear for converting the rotating motion of said pinion gear into a reciprocating motion; and an elastic member for suppressing the reciprocating motion of said reciprocating means, thereby minimizing the pivotal motion of the lower control arm.

2. The stabilizer of claim 1 wherein said reciprocating means comprises a rack gear engaged with said pinion gear, said rack gear being slidably disposed within a guide groove formed on the sub-frame.

3. The stabilizer of claim 1 wherein said elastic member comprises a compression spring fixedly disposed between an end of the guide groove and one end of the rack gear distal from said hinge rod.

4. A stabilizer as recited in claim 1 wherein the first gear is a pinion gear.

5. A stabilizer as recited in claim 4 wherein the second gear is a rack gear engaging the pinion gear for converting rotational motion of the pinion gear to reciprocating motion.

6. A stabilizer as recited in claim 5 wherein the rack gear is slidingly coupled to the frame.

7. A stabilizer as recited in claim 6 wherein the rack gear is slidingly coupled to a bore having an end and formed on a sub-frame connected to said frame.

8. A stabilizer as recited in claim 7 the spring is mounted between the end of the bore and an end of the rack for biasing the rack away from the bore end.

9. A stabilizer as recited in claim 1 wherein said rotating means comprises a pinion gear fixed around a hinge rod, said hinge rod pivotally coupling the lower control arm to the sub-frame.

10. A stabilizer as recited in claim 9 wherein said reciprocating means comprises a rack gear engaged with said pinion gear, said rack gear being slidably disposed within a guide groove formed on the sub-frame.

11. A stabilizer of claim 9 wherein said elastic member comprises a compression spring fixedly disposed between an end of the guide groove and one end of the rack gear distal form said hinge rod.

12. A stabilizer for a vehicle, said vehicle having a control arm coupling a wheel to a frame of said vehicle, wherein the control arm is pivotally coupled to frame, the stabilizer comprising:

a first gear coupled to the control arm for rotating as the control arm pivots;

a second gear coupled to the first gear; and a spring coupled to the second gear and to the frame for suppressing movement of the second gear.

13. A stabilizer for a vehicle, said vehicle comprising an automotive suspension having a lower control arm connecting a wheel to a sub-frame, said stabilizer comprising:

rotating means for rotating together with a pivotal motion of the lower control arm;

reciprocating means engaging the rotating means for converting the rotating motion of said rotating means into a reciprocating motion; and an elastic member for suppressing the reciprocating motion of said reciprocating means, thereby minimizing the pivotal motion of the lower control arm.

* * * * *